US009989010B2

(12) United States Patent
Dussol et al.

(10) Patent No.: US 9,989,010 B2
(45) Date of Patent: Jun. 5, 2018

(54) THRUST REVERSER FOR AN AIRCRAFT ENGINE, POD ASSEMBLY AND CORRESPONDING POWERPLANT

(71) Applicant: Airbus Operations (SAS), Toulouse (FR)

(72) Inventors: Loic Dussol, Toulouse (FR); Jerome Dane, Ventabren (FR); Hugo Herisson, Roques sur Garonne (FR)

(73) Assignee: Airbus Operations (SAS), Toulouse (FR)

( * ) Notice: Subject to any disclaimer, the term of this patent is extended or adjusted under 35 U.S.C. 154(b) by 282 days.

(21) Appl. No.: 14/959,384

(22) Filed: Dec. 4, 2015

(65) Prior Publication Data

US 2016/0160796 A1    Jun. 9, 2016

(30) Foreign Application Priority Data

Dec. 5, 2014   (FR) ..................... 14 61948

(51) Int. Cl.
  *F02K 1/54*    (2006.01)
  *F02K 1/82*    (2006.01)
  *F02K 1/72*    (2006.01)

(52) U.S. Cl.
  CPC ............... *F02K 1/827* (2013.01); *F02K 1/72* (2013.01); *F05D 2250/283* (2013.01); *F05D 2260/963* (2013.01); *Y02T 50/671* (2013.01)

(58) Field of Classification Search
  CPC ..... F02K 1/54; F02K 1/56; F02K 1/62; F02K 1/605; F02K 1/625; F02K 1/64; F02K 1/68; F02K 1/70; F02K 1/72; F02K 1/827
  See application file for complete search history.

(56) References Cited

U.S. PATENT DOCUMENTS

| 6,557,799 B1* | 5/2003 | Sternberger | ........... B64D 33/04 244/1 N |
| 2003/0042358 A1* | 3/2003 | Sternberger | ............. F02K 1/72 244/110 B |
| 2004/0045766 A1 | 3/2004 | Porte et al. | |

(Continued)

FOREIGN PATENT DOCUMENTS

| CA | 2887470 | 5/2014 |
| EP | 1398473 | 3/2004 |

(Continued)

OTHER PUBLICATIONS

French Search Report, dated Jul. 29, 2015.

*Primary Examiner* — Steven Sutherland
(74) *Attorney, Agent, or Firm* — Greer, Burns & Crain, Ltd.

(57) ABSTRACT

A thrust reverser for an aircraft engine assembly, comprising two sub-assemblies configured to surround an engine, each of the sub-assemblies comprising an inner fixed structure, a translating cowl, a torque box, a substantially vertical 12 o'clock bifurcation, and a substantially vertical 6 o'clock bifurcation. At least one of the sub-assemblies comprises at least one separating partition extending between the inner fixed structure, the translating cowl and the torque box of the sub-assembly, the separating partition being rigidly fixed to the inner fixed structure and the torque box, and connected to the translating cowl via a sliding connection.

14 Claims, 5 Drawing Sheets

(56) References Cited

U.S. PATENT DOCUMENTS

| | | | |
|---|---|---|---|
| 2004/0159741 A1* | 8/2004 | Sternberger | F02K 1/72 244/110 B |
| 2012/0168248 A1 | 7/2012 | Burak et al. | |
| 2014/0116025 A1 | 5/2014 | Todorovic | |
| 2014/0341744 A1 | 11/2014 | Cazuc et al. | |

FOREIGN PATENT DOCUMENTS

| | | |
|---|---|---|
| EP | 2725217 | 4/2014 |
| GB | 1369434 | 10/1974 |
| WO | 2011034469 | 3/2011 |

* cited by examiner

THRUST REVERSER FOR AN AIRCRAFT ENGINE, POD ASSEMBLY AND CORRESPONDING POWERPLANT

CROSS-REFERENCES TO RELATED APPLICATIONS

This application claims the benefit of the French patent application No. 1461948 filed on Dec. 5, 2014, the entire disclosures of which are incorporated herein by way of reference.

BACKGROUND OF THE INVENTION

The present invention relates to a thrust reverser for an aircraft engine assembly. It particularly relates to such a thrust reverser comprising acoustic panels to reduce the noise generated by the powerplant.

The invention also relates to a pod for an aircraft engine assembly, comprising such a thrust reverser, and to a powerplant comprising such a thrust reverser.

An aircraft engine assembly comprises an engine and a pod. The pod usually comprises a portion referred to as the thrust reverser enabling the thrust exerted by the engine to be oriented forward to slow down the aircraft, if needed. On commercial aircraft, such a thrust reverser usually has surfaces forming acoustic panels. These panels are configured to absorb and/or dampen the sound waves that they receive in order to limit the noise produced by the engine. Such an acoustic panel of a pod is described in EP 1 398 473, for example.

To improve aircraft performance, builders tend to produce pods that are increasingly shorter. The thrust reversers of these pods are also shorter. On these shorter thrust reversers, the surfaces on which acoustic panels can be formed are reduced, and may become insufficient to obtain the desired noise reduction.

SUMMARY OF THE INVENTION

The present invention aims to remedy the drawbacks of the prior art. In particular, it aims to provide a thrust reverser for an aircraft engine assembly that provides a greater amount of surfaces which can form acoustic panels, in order to better reduce the noise produced by the engine.

These objectives, as well as others that will become more apparent below, are achieved by means of a thrust reverser for an aircraft engine assembly, comprising two sub-assemblies intended to surround an engine, each of said sub-assemblies comprising an inner fixed structure, a translating cowl, a torque box, a substantially vertical 12 o'clock bifurcation partition, and a substantially vertical 6 o'clock bifurcation partition, wherein at least one of said sub-assemblies comprises at least one separating partition rigidly fixed to the inner fixed structure of the sub-assembly and the torque box of the sub-assembly, and connected to the translating cowl of the sub-assembly by means of a sliding connection.

Owing to this separating partition, which is separate from the 12 o'clock and the 6 o'clock bifurcations, the thrust reverser comprises a greater number of surfaces which can form acoustic panels, thereby offering better reduction of the noise produced by the engine. Furthermore, the separating partition can also effectively participate in the mechanical performance of the thrust reverser.

Preferably, at least a portion of the surface of the separating partition comprises an air-porous outer layer and an inner layer defining chambers, the chambers being closed by the outer layer.

This surface may thus form an acoustic panel effectively reducing the noise produced by the powerplant.

According to an advantageous embodiment, the or at least one of the separating partitions forms a one-piece assembly with at least a portion of the inner fixed structure.

The thrust reverser may thus be comprised of a smaller number of separate parts, and exhibit better mechanical characteristics.

Preferably, the separating partition(s) separate a first stream of airflow between the inner fixed structure, the 12 o'clock bifurcation partition, the translating cowl and the separating partition(s), a second airflow between the inner fixed structure, the 6 o'clock bifurcation partition, the translating cowl and the separating partition(s).

Preferably, the thrust reverser defines a location intended to receive an engine extending along a longitudinal axis of the pod and, in each of the sub-assemblies:

the inner fixed structure partially surrounds the location intended to receive the engine;

the translating cowl at least partially surrounds the inner fixed structure, at a distance therefrom;

the torque box at least partially surrounds the inner fixed structure, at a distance therefrom;

the 12 o'clock bifurcation extends in a plane substantially parallel to the longitudinal axis of the pod and substantially vertical above the location intended for the engine, and rigidly connecting the inner fixed structure and the torque box;

the 6 o'clock bifurcation extends in a plane substantially parallel to the longitudinal axis of the pod and substantially vertical below the location intended for the engine, and rigidly connecting the inner fixed structure and the torque box;

the translating cowl being mobile in translation, along an axis substantially parallel to the longitudinal axis of the pod, in relation to the inner fixed structure, to the torque box and to the 12 o'clock and 6 o'clock bifurcations, between:

a first position wherein the torque box is in the extension of the translating cowl, such that the torque box and the translating cowl form a housing adapted to guide an airflow flowing between the housing and the inner fixed structure in a direction substantially parallel to the longitudinal axis of the pod;

a second position wherein an opening adapted to the airstream exists between the torque box and the translating cowl.

Preferably, the separating partition extends in a plane substantially parallel to the longitudinal axis of the pod, and is connected to the translating cowl by a sliding connection along an axis substantially parallel to the longitudinal axis of the pod.

Preferably, the partition(s) extend in a plane forming an angle less than 40° with the horizontal.

According to an advantageous embodiment, at least one of the sub-assemblies comprises a single separating partition which extends in a plane forming an angle less than 10° with the horizontal.

According to another advantageous embodiment, at least one of the sub-assemblies comprises two separating partitions, each extending in a plane forming an angle between 20° and 40° with the horizontal.

Advantageously, the separating partition(s) extend over at least half the length of the thrust reverser.

Preferably, the separating partition(s) extend over at least 75% of the length of the thrust reverser.

The present invention also relates to a pod for an aircraft engine assembly, comprising a thrust reverser as described above.

The present invention also relates to an aircraft engine assembly, comprising a thrust reverser as described above.

BRIEF DESCRIPTION OF THE DRAWINGS

Other features and advantages will become apparent from the following description, given by way of example only, with reference to the accompanying drawings in which.

DETAILED DESCRIPTION OF THE PREFERRED EMBODIMENTS

Figure 1:
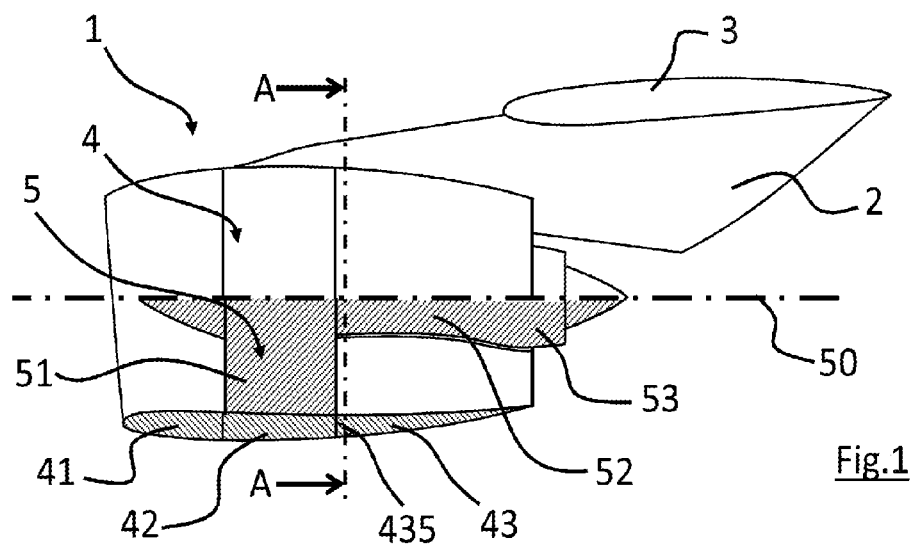
FIG. 1 represents an aircraft powerplant in a side and partial sectional view along a longitudinal plane.

FIG. 1 represents a powerplant 1 of an aircraft, forming a turbofan engine, secured to an aircraft wing 3 by means of a pylon 2. The powerplant comprises an engine 5 and the pod 4 forming a shroud around the engine 5.

The axis 50, notably represented in FIG. 1, corresponds to the longitudinal direction of the powerplant 1, i.e., the axis of rotation of the rotating parts of the engine 5. The left-hand side of FIGS. 1, 2, 3, 5 and 6 corresponds to the front of the powerplant 1, while the right-hand side of FIGS. 1, 2, 3, 5 and 6 corresponds to the rear of this powerplant. In this document, the planes parallel to or substantially parallel to the axis 50 are referred to as longitudinal planes, and the planes perpendicular to or substantially perpendicular to this axis 50 are called transverse planes. It is considered that a plane is substantially parallel to the axis 50 if it comprises a straight line forming an angle less than 5° with this axis. Furthermore, it is considered that a plane is substantially perpendicular to the axis 50 if it comprises a straight line forming an angle between 85° and 95° with this axis. It is also considered that a plane or a straight line is substantially vertical, or substantially horizontal, respectively, if it forms an angle less than 5° with the vertical or horizontal direction, respectively.

In FIG. 1, the pod 4 is represented in a cross-sectional view below the axis 50, in order to show the engine 5.

The engine 5 notably comprises, from the front to the rear:
a fan 51, which blows air rearward to form the primary airflow and the secondary airflow within the powerplant 1,
the engine core 52, through which the primary airflow passes and which comprises the compressors, the combustion chamber and the turbines, and
the jet nozzle 53, through which the primary airflow exits.
The pod 4 notably comprises, from the front to the rear:
an air intake 41, in front of the fan 51 of the engine 5,
a fan cowl 42, which surrounds the fan 51 of the engine 5,
a thrust reverser 43, which guides the secondary airflow handled by the fan 51.

The thrust reverser 43 is comprised of two sub-assemblies, which are joined to the right and to the left of the engine core 52, respectively. These two sub-assemblies are substantially symmetrical. One of these sub-assemblies is represented in greater detail, in a cross-sectional view in, FIGS. 2 and 3. Each of the sub-assemblies comprises:
an inner fixed structure (IFS) 431, the cowls of both sub-assemblies surrounding the core 52 of the engine 5,
a torque box 435, the torque boxes of the two sub-assemblies forming a ring centered on the axis 50 in the extension of the fan cowl 42, and
a translating cowl 432, the translating cowls of both sub-assemblies substantially forming a cylinder of revolution (or a substantially cylindrical truncated cone) centered on the axis 50.

The translating cowl 432 can slide substantially in the direction of the axis 50, in relation to the rest of the powerplant 1, between a first position, wherein the thrust reverser 43 is said to be "inactive", and a second position in which the thrust reverser 43 is said to be "active".

Figure 2:
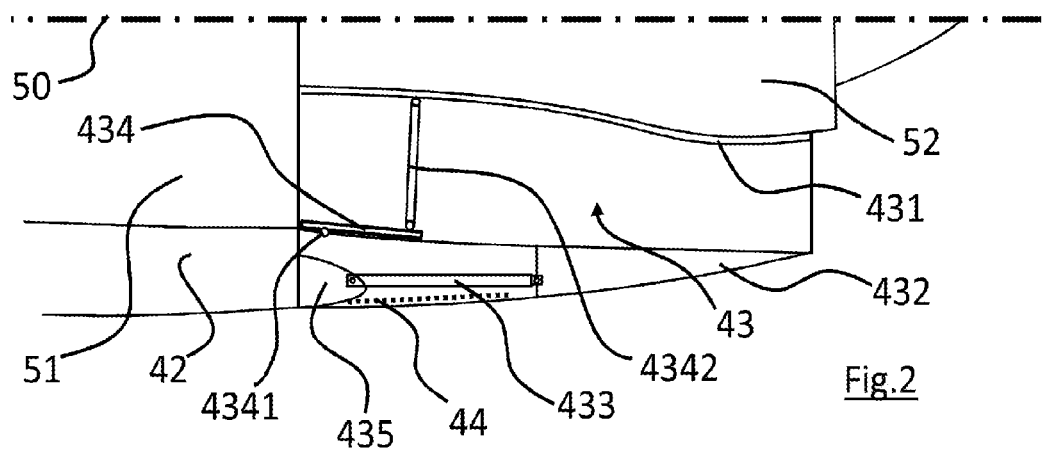
FIG. 2 is a partial sectional view of the powerplant shown in FIG. 1 along a longitudinal plane, showing an inactive thrust reverser.

FIG. 2 represents the inactive thrust reverser 43. In this position, the translating cowl 432 extends in the extension of the fan cowl 42 and is in contact with the torque box 435. The secondary airflow, directed rearward by the fan 51 is guided between the inner fixed structure 431 and the translating cowl 432 to form an annular flow projected rearward. The powerplant 1 then operates in normal regime to propel the aircraft.

Figure 3:
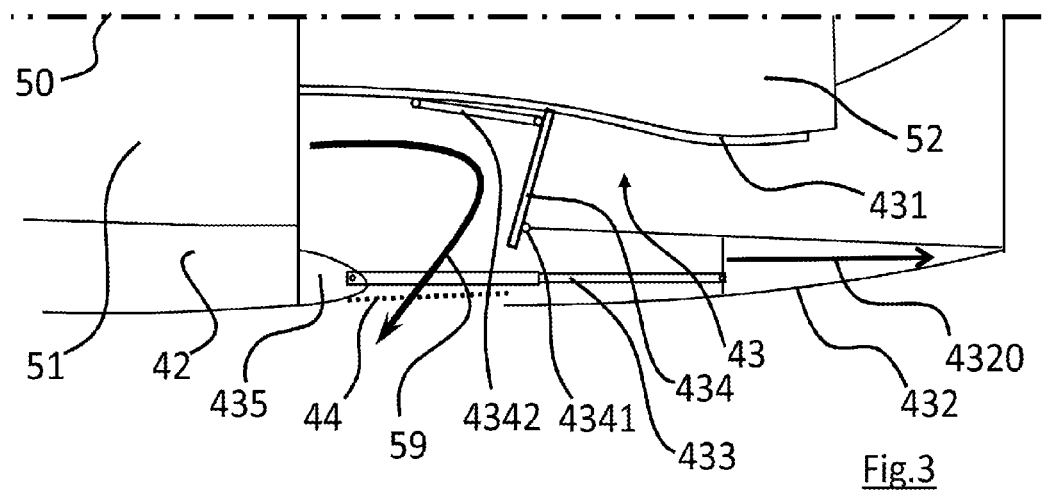
FIG. 3 is a partial sectional view of the powerplant shown in FIG. 1 along a longitudinal plane, showing an active thrust reverser.

FIG. 3 represents the active thrust reverser 43. In this position, the translating cowl 432 is shifted rearward, so as to leave an opening between the translating cowl 432 and the torque box 435. This rearward displacement of the translating cowl 432, which is represented by the arrow 4320, is a sliding motion in the direction of the axis 50. It is controlled by a plurality of cylinders 433 which are connected to the translating cowl 432 by one of their ends, and to the torque box 435 by their other ends.

The thrust reverser 43 also comprises blocker doors 434, which are associated with the translating cowl 432 by hinges 4341 and connected to the inner fixed structure 431 via rods 4332. When the thrust reverser 43 is inactive, as shown in FIG. 2, the blocker doors 434 are maintained, by the rods 4342, along the translating cowl 432, so as not to disrupt the secondary airflow. On the contrary, when the thrust reverser 43 is active, as shown in FIG. 3, the blocker doors 434 are placed, by the rods 4342, between the translating cowl 432 and the inner fixed structure 431, so as to prevent the passage of the secondary airflow. The air secondary airflow, directed rearward by the fan 51 is then directed toward the opening that appears between the torque box 435 and the translating cowl 432 and escaping from the powerplant 1 through the grills 44. This secondary airflow, symbolized by the arrow 59, is then directed forward, and generates a thrust from the powerplant 1 rearward. The powerplant 1 then reverses thrust to brake the aircraft.

Figure 4:
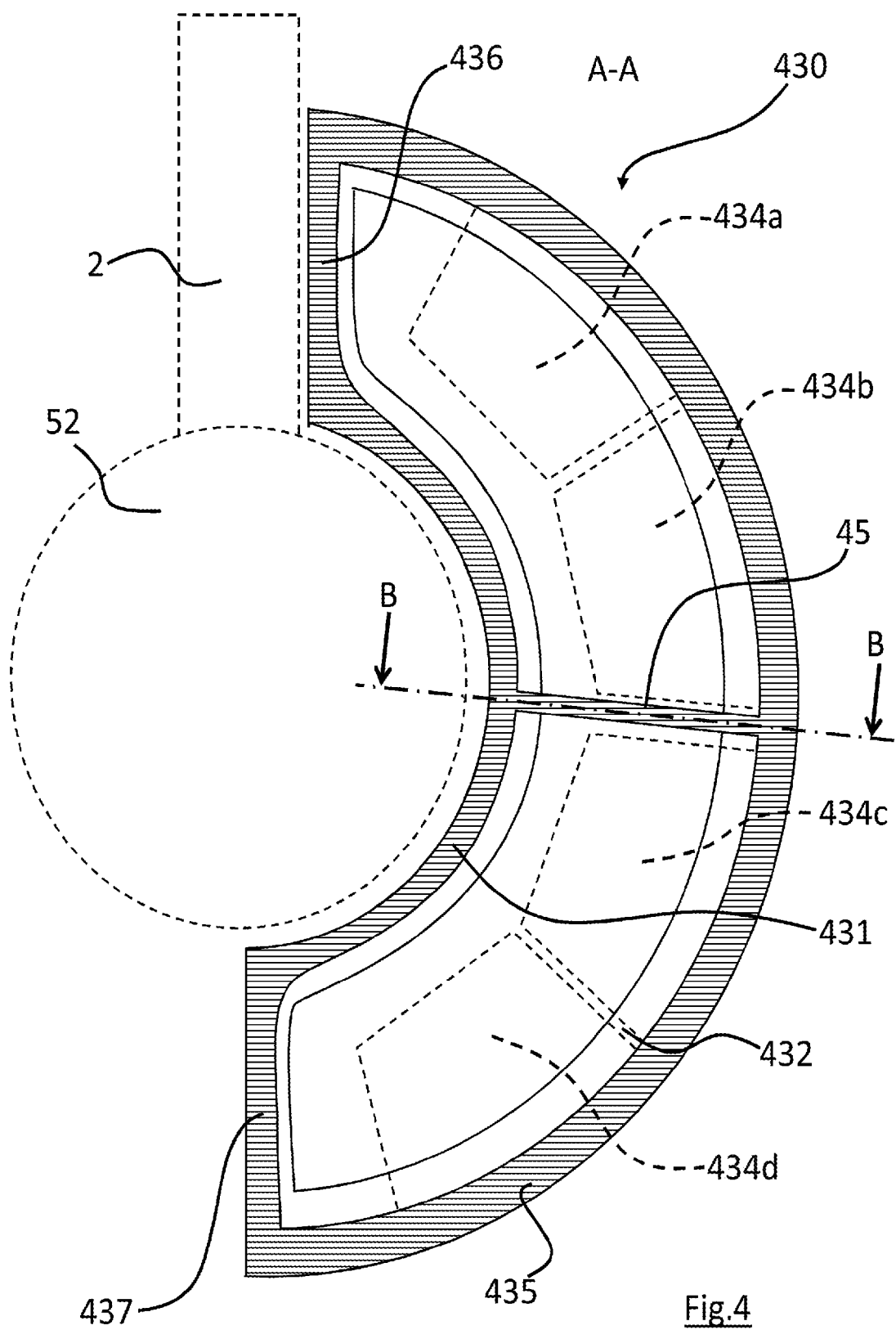
FIG. 4 is a partial sectional view of the pod of the powerplant shown in FIG. 1 along a transverse plane, showing an acoustic splitter according to an embodiment of the invention.

FIG. 4 shows a sub-assembly 430 of the thrust reverser 43 in a cross-sectional view. This sub-assembly 430 comprises an inner fixed structure 431, which surrounds approximately half the circumference of the engine core 52 (shown as dotted lines in FIG. 4) and is fixed relative to this core 52. It also comprises the torque box 435, which is fixed relative to the core 52, and the translating cowl 432 slidable in the longitudinal direction.

The torque box 435 is connected to the inner fixed structure 431 via the 12 o'clock bifurcation 436 and the 6 o'clock bifurcation 437. The 12 o'clock bifurcation 436 extends in a substantially vertical longitudinal plane above the engine core 52, along the pylon 2 (shown in dotted lines in FIG. 4) which supports the engine 5. The 6 o'clock bifurcation 437 extends in a substantially vertical longitudinal plane below the engine core 52. Each of these bifurcation partitions 436 and 437 are rigidly fixed to the cowl 431 and to the torque box 435, and is connected to translating cowl 432 via a sliding connection. The air comprising the secondary airflow is split in two by these bifurcation walls as it passes into the thrust reverser 43, with half the air passing through each of the sub-assemblies of the thrust reverser 43.

As shown in FIG. 4, the thrust reverser 43 also comprises a separating partition, or a longitudinal acoustic partition 45 (also referred to as an "acoustic separator" or "acoustic splitter"), extending between the inner fixed structure 431 and the torque box 435, and the translating cowl 432. This acoustic splitter 45, which comprises surfaces forming an acoustic panel, extends in a longitudinal plane, i.e., in the direction of the secondary airflow in the thrust reverser. It then separates this secondary airflow into streams running along either side of the acoustic splitter 45.

Figure 11:
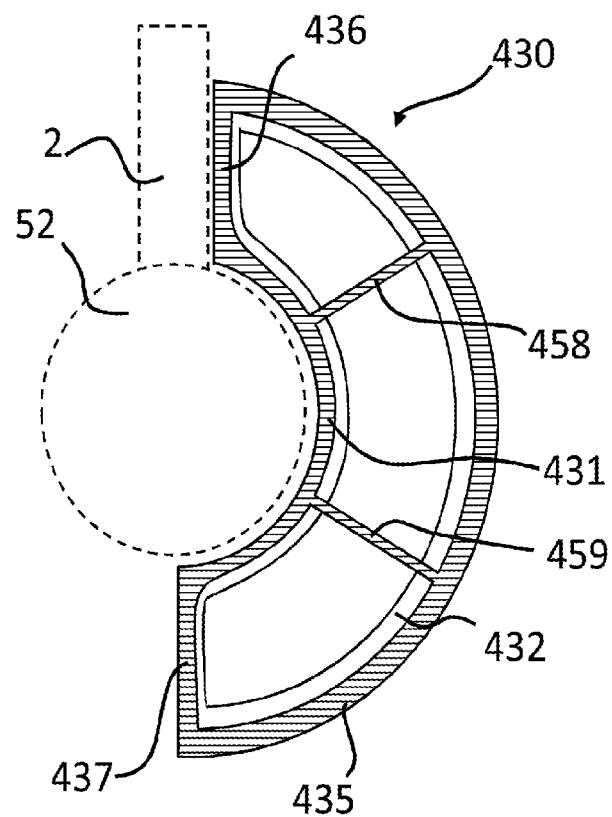
FIG. 11 is a partial sectional view of a thrust reverser according to another embodiment of the invention, along a transverse plane, showing two acoustic splitters.

In the embodiment shown in FIG. 4, this acoustic splitter 45 extends in a plane passing through the axis 50 and forming an angle of 90°+/−10° with the bifurcation partitions 436 and 437. It is would be possible, however, in other embodiments of the invention, to place one or more acoustic splitters in other positions. For example, FIG. 11 is a cross-sectional view along a transverse plane of a sub-assembly 430 of a thrust reverser according to another embodiment of the invention, comprising two acoustic splitters 458 and 459, each extending in a plane passing through the axis 50, and forming an angle of 60°+/−10° with one of bifurcation partitions 436 and 437 and with the other acoustic splitter.

FIG. 4 also shows, in dotted lines, the blocker doors 434a to 434d, in the position that they occupy when the thrust reverser 43 is active. As shown in this figure, the acoustic splitter 45 is positioned so as to be located between the two blocker doors 434b and 434c, so as not to interfere with these doors during their movement.

Of course, the second sub-assembly of the thrust reverser 43 may be symmetrical to the first sub-assembly 430, and may thus also include one or more acoustic splitters.

Figure 5:
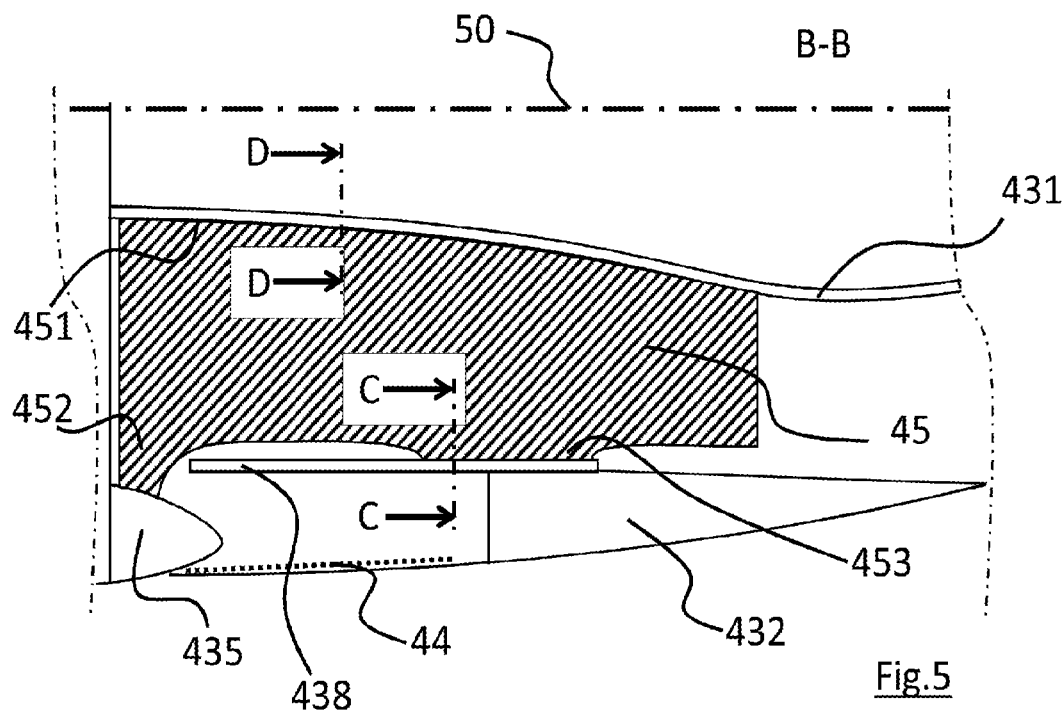
FIG. 5 is a cross-sectional view of the pod shown in FIG. 4, along the median plane of the acoustic splitter, when the thrust reverser is inactive.
Figure 6:
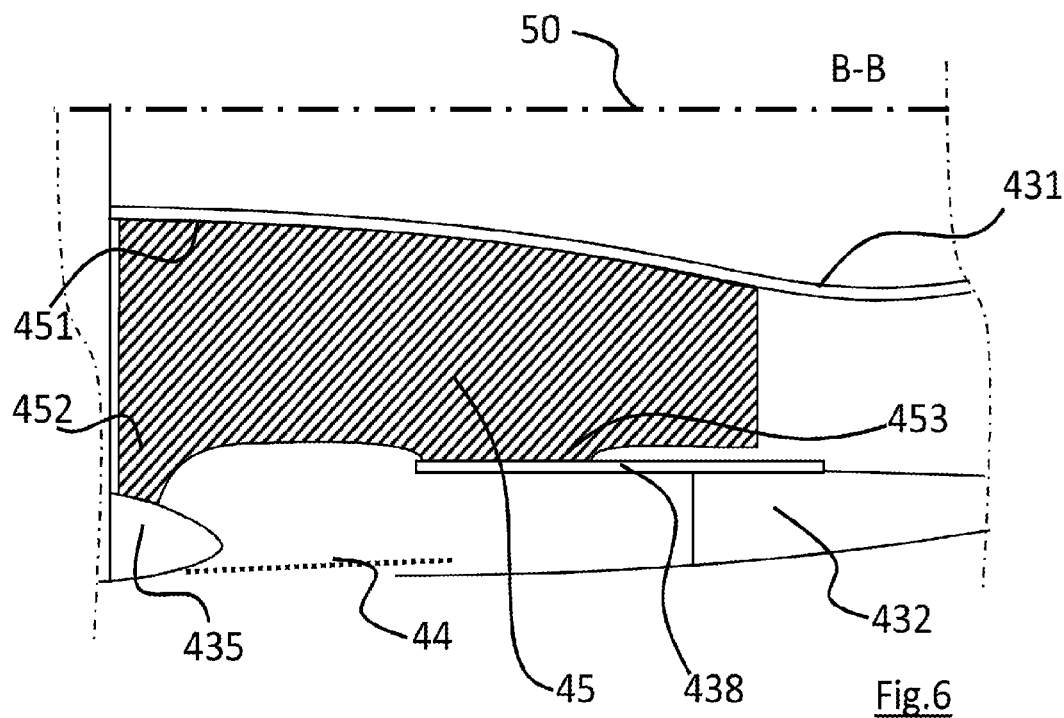
FIG. 6 is a cross-sectional view of the pod shown in FIG. 4, along the median plane of the acoustic splitter, when the thrust reverser is inactive.

FIGS. 5 and 6 are partial sectional views of the sub-assembly 430 of the thrust reverser 43, along the plane of the acoustic splitter 45. As shown in this figure, the acoustic splitter 45 extends over nearly the entire width of the air passage between the inner fixed structure 431 and the translating cowl 432. This acoustic splitter 45 also extends, longitudinally, over a large portion of the length of the thrust reverser. In the embodiment represented, it extends over approximately three quarters of the length of the thrust reverser. It may be longer or shorter in the various possible embodiments of the invention. It is, however, preferable that it extends over more than half the length of the thrust reverser, to provide a significant surface forming an acoustic panel.

The acoustic splitter 45 is connected, along its edge 453, to the translating cowl 432 of the thrust reverser 43 via a sliding connection preferably oriented along an axis substantially parallel to the axis 50. An embodiment of this connection is shown in detail in FIG. 7, in a cross-sectional view along a transverse plane. As shown in this figure, the edge 453 of the acoustic splitter 45 is comprised of a slide 455, in which a slider 438, integral with the translating cowl 432, can slide. The slide 455 and the slider 438 may have additional shapes of known type, such as a dovetail, for example.

The acoustic splitter 45 is fixedly connected, along its edge 451, to the inner fixed structure 431 of the thrust reverser 43. An embodiment of this connection is shown in detail in FIG. 8, in a cross-sectional view along a transverse plane. As shown in this figure, the edge 451 of the acoustic splitter 45 is interposed between two portions 4311 and 4312 of the inner fixed structure 431, and is connected to these portions by means of brackets 61 and 62 mounted on the inner face of the inner fixed structure 431.

Figure 8:
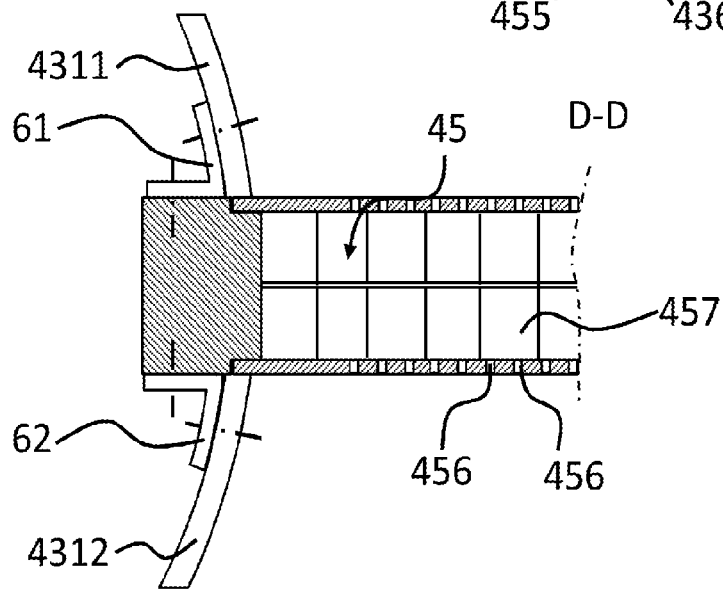
FIG. 8 is a cross-sectional view of a detail of the pod shown in FIG. 4 along a transverse plane, showing the junction of the acoustic splitter with the inner fixed structure of the thrust reverser, according to a first variant of the invention.
Figure 9:
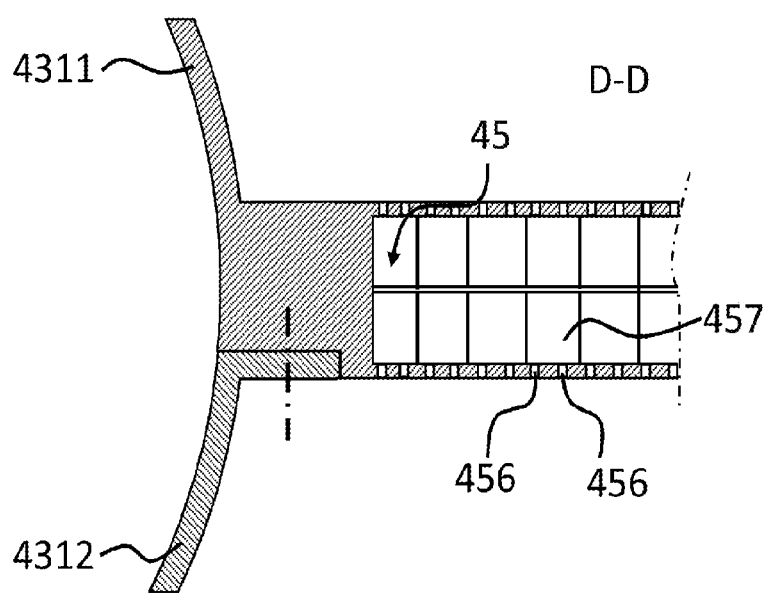
FIG. 9 is a cross-sectional view of a detail of the pod shown in FIG. 4 along a transverse plane, showing the junction of the acoustic splitter with the inner fixed structure of the thrust reverser, according to another variant of the invention.

FIG. 9 represents the connection of the acoustic splitter 45 to the inner fixed structure 431 of the thrust reverser 43, according to a variant of the embodiment represented in FIG. 8. In this variant, the acoustic splitter 45 and a portion 4311 of the inner fixed structure 431 are manufactured as a one-piece assembly, and the second portion 4312 of the inner fixed structure 431 is assembled with this one-piece assembly by conventional fastening means, such as rivets, screws or glue.

Figure 10:
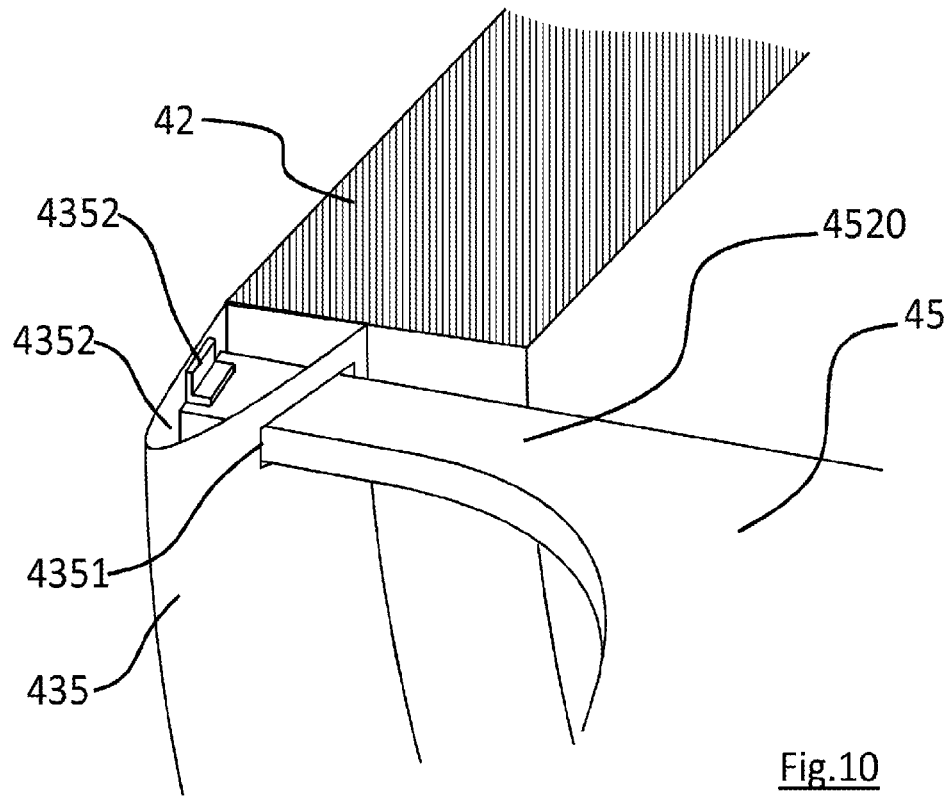
FIG. 10 represents a perspective view of a detail of the pod shown in FIG. 4, cut along a longitudinal plane, showing the junction of the acoustic splitter with the torque box of the thrust reverser.

The acoustic splitter 45 is fixedly connected, near its corner 452, to the torque box 435 of the thrust reverser 43. An embodiment of this connection is represented in detail in FIG. 10, in a perspective view along a longitudinal plane. As shown in this figure, the connection between the acoustic splitter 45 and the torque box 435 is made via a connecting tab 4520, integral with the corner of the acoustic splitter 45. The torque box 435 is hollow, and comprises an internal sheet, turned toward the interior of the pod, and an external sheet, turned toward the exterior of the pod. In the embodiment represented, the internal sheet has an opening 4351 enabling connecting tab 4520 to pass through it, such that this connecting tab 4520 extends inside the torque box 435, to the external sheet. A bracket 4352 allows the end of this tab 4520 to be secured to the external sheet by means of rivets, screws, glue or any other suitable means. Other means of attaching the connecting tab 4520 can of course be implemented, in other embodiments.

The connections of the acoustic splitter 45 with the inner fixed structure 431, with the torque box 435 and with the translating cowl 432 of the thrust reverser 43, allow this acoustic splitter 45 to assist in the mechanical strength of the thrust reverser 43. Thus, in a thrust reverser comprising such an acoustic splitter, the bifurcation partitions and the internal and external cowls are less mechanically stressed than in a thrust reverser without an acoustic splitter. It is consequently possible to dimension a thrust reverser to resist lesser stresses, when it comprises such an acoustic splitter. This reduction in weight makes it possible to compensate, at least in part, the increase in the weight of the thrust reverser due to the presence of the acoustic splitter.

Figure 7:
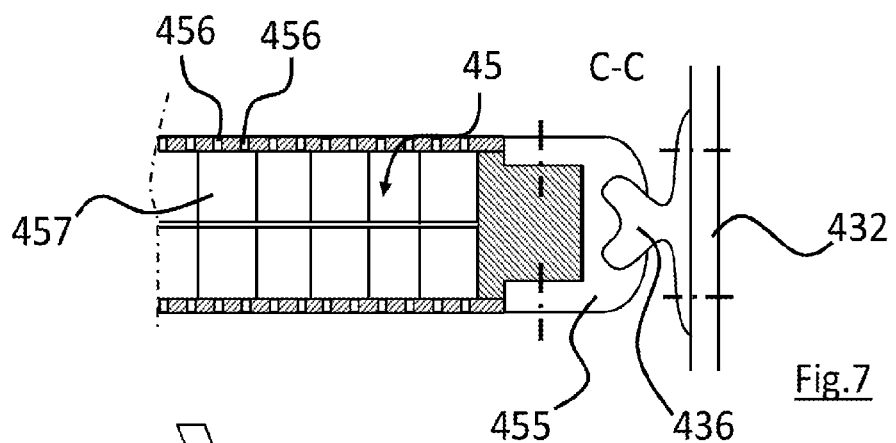
FIG. 7 is a cross-sectional view of a detail of the pod shown in FIG. 4 along a transverse plane, showing the junction of the acoustic splitter with the translating cowl of the thrust reverser.

The acoustic splitter 45 preferably comprises surfaces forming acoustic panels on both sides, configured to absorb and/or dampen sound waves that it receives, in order to limit the noise produced by the engine. The acoustic splitter 45, providing a large surface for these panels, allows the noise produced by the engine to be reduced significantly. As shown in FIGS. 7 to 9, these acoustic panels can conventionally be formed by porous surfaces, for example, pierced with a plurality of holes 456, leading to chambers 457, formed by a honeycomb structure for example. The dimensions of the chambers and holes may be chosen, according to known criteria, to optimize the damping and/or absorption of sound waves.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A thrust reverser for an aircraft engine assembly, comprising:
   two sub-assemblies configured to surround an engine, each of said sub-assemblies comprising:
      an inner fixed structure,
      a translating cowl,
      a torque box,
      a substantially vertical 12 o'clock bifurcation, and
      a substantially vertical 6 o'clock bifurcation,
   at least one of said sub-assemblies comprising:
   at least one separating partition rigidly fixed to said inner fixed structure of said sub-assembly and to said torque box of said sub-assembly, and connected to said translating cowl of said sub-assembly by a sliding connection; and,
   a blocker door connected at a first end to the inner fixed structure and at a second end, opposite the first end, to the translation cowl.

2. The thrust reverser according to claim 1, wherein at least a portion of a surface of the at least one separating partition comprises an air-porous outer layer and an inner layer defining chambers, said chambers being closed by said air-porous outer layer.

3. The thrust reverser according to claim 1, wherein said at least one separating partitions forms a one-piece assembly with at least a portion of said inner fixed structure.

4. The thrust reverser according to claim 1, wherein said at least one separating partition separates a first stream of airflow between said inner fixed structure, said substantially vertical 12 o'clock bifurcation, said translating cowl and said at least one separating partition, and a second airstream between said inner fixed structure, said substantially vertical 6 o'clock bifurcation, said translating cowl and said at least one separating partition.

5. The thrust reverser according to claim 1, wherein the thrust reverser defines a location configured to receive an engine extending along a longitudinal axis of a pod, and wherein, in each of said sub-assemblies:
   said inner fixed structure partially surrounds the location intended to receive said engine;
   said translating cowl at least partially surrounds said inner fixed structure, at a distance therefrom;
   said torque box at least partially surrounds said inner fixed structure, at a distance therefrom;
   said substantially vertical 12 o'clock bifurcation extends in a plane substantially parallel to the longitudinal axis of the pod and substantially vertical above the location configured for the engine, and rigidly connects said inner fixed structure and said torque box;
   said substantially vertical 6 o'clock bifurcation extends in a plane substantially parallel to the longitudinal axis of the pod and substantially vertical below the location configured for the engine, and rigidly connects said inner fixed structure and said torque box;
   said translating cowl being mobile in translation along an axis substantially parallel to the longitudinal axis of the pod, in relation to said inner fixed structure, to said torque box and to said substantially vertical 12 o'clock and substantially vertical 6 o'clock bifurcations, between:
      a first position wherein said torque box is in the extension of said translating cowl, such that said torque box and said translating cowl form a housing adapted to guide airflow flowing between said housing and said inner fixed structure in a direction substantially parallel to the longitudinal axis of the pod;
      a second position wherein an opening adapted to an airstream exists between said torque box and inner fixed structure.

6. The thrust reverser according to claim 5, wherein said at least one separating partition extends in a plane substantially parallel to the longitudinal axis of the pod, and is connected to said translating cowl by a sliding connection whose axis is substantially parallel to the longitudinal axis of the pod.

7. The thrust reverser according to claim 1, wherein said at least one separating partition extend in a plane forming an angle less than 40° with a horizontal plane.

8. The thrust reverser according to claim 7, wherein at least one of said sub-assemblies comprises a single separating partition which extends in a plane forming an angle less than 10° with the horizontal plane.

9. The thrust reverser according to claim 7, wherein at least one of said sub-assemblies comprises two separating partitions which extend in a plane forming an angle between 20° and 40° with the horizontal plane.

10. The thrust reverser according to claim 1, wherein said at least one separating partition extends over at least half the length of the thrust reverser.

11. The thrust reverser according to claim 10, wherein said at least one separating partition extends over at least 75% of the length of the thrust reverser.

12. The thrust reverser according to claim 1, wherein the blocker door is secured to the fixed inner structure with a rod.

13. The thrust reverser according to claim 12, wherein the blocker door is configured to move between two positions, an inactive position in which the blocker door is placed along the translating cowl, and an active position in which the blocker door is between the inner fixed structure and translating cowl.

14. A pod for an aircraft engine assembly, comprising a thrust reverser comprising:
two sub-assemblies surrounding an engine, each of said sub-assemblies comprising:
an inner fixed structure,
a translating cowl,
a torque box,
a substantially vertical 12 o'clock bifurcation, and
a substantially vertical 6 o'clock bifurcation,
at least one of said sub-assemblies comprising:
at least one separating partition rigidly fixed to said inner fixed structure of said sub-assembly and to said torque box of said sub-assembly, and connected to said translating cowl of said sub-assembly by a sliding connection; and,
a blocker door connected at a first end to the inner fixed structure and at a second end, opposite the first end, to the translation cowl.

\* \* \* \* \*